March 13, 1951 A. SVOBODA 2,544,863
COMPUTING LINKAGE
Filed Feb. 21, 1946 3 Sheets-Sheet 1

*INVENTOR.*
ANTONIN V. SVOBODA
BY
*m.o.Hayes*
ATTORNEY

March 13, 1951  A. SVOBODA  2,544,863
COMPUTING LINKAGE
Filed Feb. 21, 1946  3 Sheets-Sheet 2

*INVENTOR.*
ANTONIN V. SVOBODA
BY
ATTORNEY

Patented Mar. 13, 1951

2,544,863

UNITED STATES PATENT OFFICE 2,544,863

COMPUTING LINKAGE

Antonin Svoboda, Cambridge, Mass., assignor, by mesne assignments, to the United States of America as represented by the Secretary of the Navy Application February 21, 1946, Serial No. 649,416

2 Claims. (Cl. 235—61)

This invention relates to a computing linkage and more particularly to a computing linkage for obtaining an empirical function of an input variable.

For general information purposes in connection with the present invention, reference is made to the textbook, Computing Mechanisms and Linkages, vol. 27, by Antonin Svoboda, Massachusetts Institute of Technology, Radiation Laboratory Series, first edition 1948, McGraw-Hill Book Company, Inc.

In ballistic and other computing apparatus such a linkage, which might also be referred to as an arbitrary function generator, provides a simple linkage system of inexpensive construction. In the course of solving the ballistic equations, it is necessary to reproduce an empirical function of these equations mechanically with a linkage having a relation between its input and output motion which corresponds to the equation itself.

It is accordingly an object of the present invention to provide a mechanical computing linkage of rugged compact construction.

A further object of the present invention is to provide a computing linkage for determining an empirical function of an input variable.

Still another object of the present invention is to provide a computing linkage having two slidable members and a linkage system operatively connecting the members, in which the displacement of one of the slidable members is an empirical function of the displacement of the other slidable member.

Another object of the present invention is to provide a mechanical linkage for determining an empirical function of an input variable with a high degree of accuracy over its operating range.

Further objects and features of this invention, as well as its construction, arrangement, and operation, will become apparent upon a careful consideration of the following detailed description when taken together with the accompanying figures, in which:

Fig. 1B is a front view of the output section of Fig. 1 showing the critical dimensions thereof;

Fig. 1C is a front view of the connecting section of Fig. 1 showing the critical dimensions thereof;

over the range of operation of the linkage.

A mechanism embodying my invention comprises a linkage system having the necessary critical relative dimensions such that the displacement of one sliding member is proportional to an empirical function of the displacement of the other sliding member. The graphic relation between the variable and its empirical function is shown by curve K in Fig. 2. The variable $\bar{X}$ as shown on the X axis of the graph, represents the variable $R-K5d\bar{R}tw$, and the $f_1(X)$, the empirical function of the variable, is shown on the Y axis.

In the variable X, equal to $R-K5dRtw$, and its empirical function $f_1(X)$, the symbols and constants represent the following:

R represents target range (distance in yards from director to target).

$K5$ represents a constant or factor of 1.2.

$d\bar{R}tw$ represents the computational range rate which is the sum of the smoothed range rate due to relative motion of the target and a corrective term applied to range rate to compensate for the effect on shell velocity of the component of relative wind along the line of sight.

$f_1(X)$ represents the increment of the average shell velocity for lead angle computation which accounts for target motion during time of flight.

Figure 1:
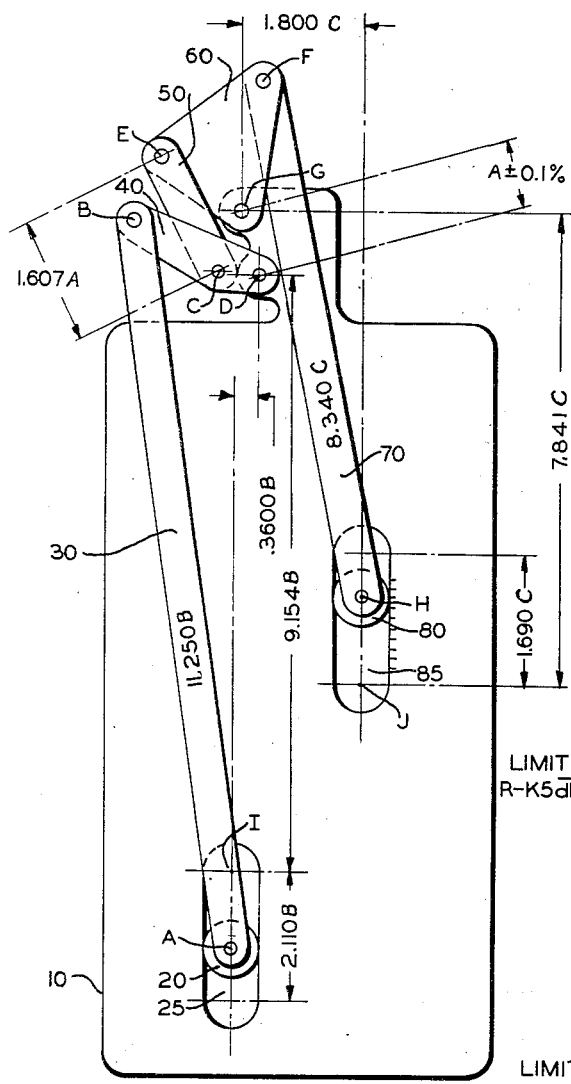
Fig. 1 is an assembly drawing of the linkage mechanism constructed according to the principles of this invention.

Referring to Fig. 1, there is shown the general arrangement of the mechanism which may be considered to consist of three sections, namely, an input section, a middle section, and an output section. The input section comprises two links 30 and 40; the middle section, links 50, one side of triangular member 60, and a portion of link 40; and the output section consists of a second side of triangular member 60 and link 70. Each of the three sections may be dimensioned in accordance with any convenient arbitrary units to determine the range of operation of the system. In the present instance, the members of the input section have an arbitrary scale unit of B, the middle section has a scale unit of A, and the output section has a scale unit of C. The linkage mechanism is supported on a planar, substantially rectangular supporting framework 10, the linkage itself being made of flat links and thereby also lying in substantially coplanar relationship with the framework. The link 50 connects a free vertex C of triangular member 40 to a free vertex E of triangular member 60. The other vertex B of triangle 40 is operatively connected to a link 30 extending from pin B to pin A in a slide block 20. In like manner the remaining vertex of triangle 60 containing pin F is operatively connected to pin H in a slide block 80. Slide blocks 20 and 80 are slidably mounted in slots 25 and 85, respectively, and are operatively connected by the linkage heretofore disclosed in such a manner that the empirical function of the variable, $R-K5d\bar{R}tw$, indicated by motion of slide block 80 corresponds to the setting of slide block 20 which indicates the input variable within the limits of operation of the device. Otherwise stated, displacement of slide block 80 is an empirical function of the displacement of slide block 20 as represented by the expression $f_1(R-K5d\bar{R}tw)$ where $(R-K5d\bar{R}tw)$ represents the displacement of slide block 20. As shown on the drawing, the operating lengths of the two slots 25 and 85 are 2.110B and 1.690C, respectively, B and C being the arbitrary units mentioned above. The length 2.110B represents an input range of the function $(R-K5d\bar{R}tw)$ between 500 yds. and 12,000 yds.; i. e., a range of 11,500 yds. This length is uniformly calibrated in yards, the spacing between calibration markers being 5450.6 yds. per inch divided by the scale factor B. Likewise, the length 1.690C of slot 85 represents an output range of the empirical function $f_1(R-K5d\bar{R}tw)$, as drawn in Fig. 2, between −.539 units and 1.301 units; i. e., a range of 1.840 units. This length is uniformly calibrated in units of $f_1(X)$, the spacing between calibrations being determined by the relationship of 1.0910 units per inch divided by the scale factor C. All the connections heretofore disclosed are pivot connections, thus allowing relative movement of the connected members, unless it is stated that the connections are fixed in character.

In order that the displacement of slide member 80 represent the empirical function of the input variable corresponding to the displacement of slide member 20 heretofore stated, the critical relative dimensions of the various members of the linkage system must be as follows (where A, B and C, representing the aforementioned arbitrary units are taken as the basis of comparison):

Length of link 30 _____ 11.250B
Length of member 40 along line B—D _____ 2.1700B±.0005
Length of member 40 along line C—D _____ .690A
Angle included between lines B—D and C—D_ 19.80°±.01°
Length of link 50 _____ 1.607A
Length of member 60 along line E—G _____ 1.195A
Length of member 60 along line G—F _____ 1.930C
Angle included between lines E—G and G—F_ 70.76°±.02°
Length of link 70 _____ 8.340C Other dimensions illustrated in Figs. 1, 1A, 1B, and 1C include the following:

Horizontal distance from pivot point D to limit  9.154B
  position I of slide 25.
Vertical distance from pivot point D to point I_ .3600B
Horizontal distance from pivot point G to limit  7.841C
  position J of slide 85.
Vertical distance from pivot point G to point J_ 1.800C
Distance from pivot point D to pivot point G __ A±0.1%
Angle included between the line of centers of  15.00°
  pivot points D and G and a line parallel to the
  line of travel of slide block 80 drawn through
  point D.
Angle of rotation of member 40 between limit  81.41°
  positions corresponding to limits of slide block
  20.
Angle included between line parallel to line of  15.20°
  travel of slide 20 through pivot point D and
  limit position of member 40 corresponding to
  lower limit of slide 25.
Angle of rotation of member 60 between limit  87.39°
  positions corresponding to limits of slide block
  80.
Angle between line perpendicular to line of  16.24°
  travel of slide 80 through pivot point G and
  limit position of member 60 corresponding to
  upper limit of slide 85.

Figure 2:
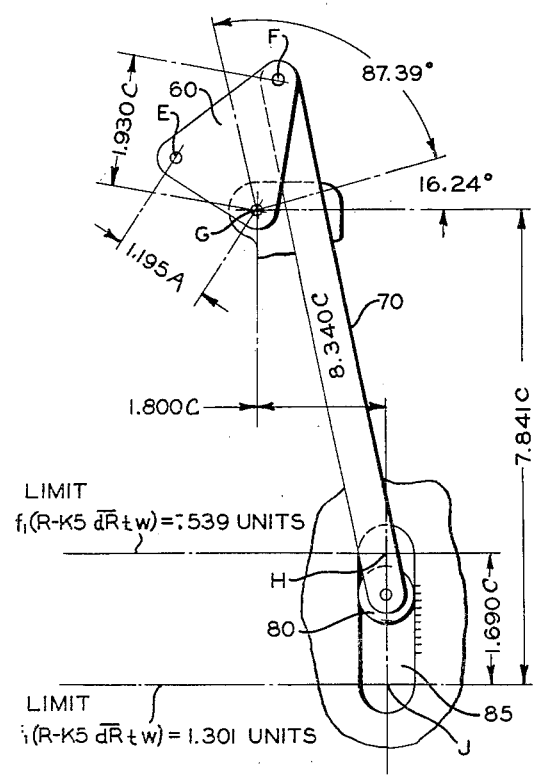
Fig. 2 is a graph showing the relation between the input variable, $R-K5d\bar{R}tw$, and its empirical function, $f_1(R-K5d\bar{R}TW)$.
Figure 2:
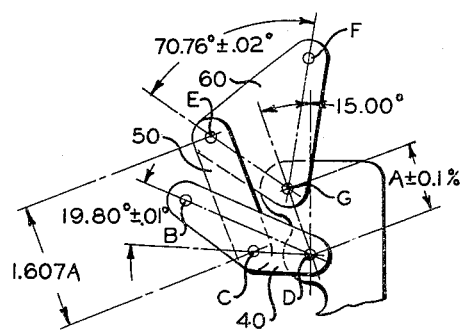
Figure 2:
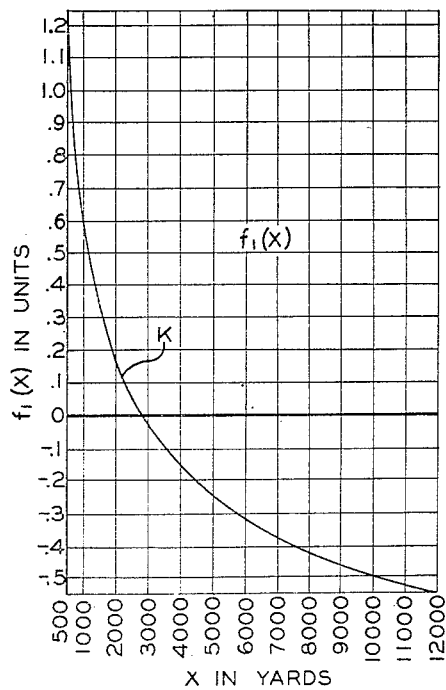

It is to be understood that in the embodiment of this invention shown in Fig. 1, that the scale adjacent to slide block 20, which may be termed the X input will not have the same scale as that adjacent to slide block 80, but the displacement will vary according to the curve K of Fig. 2.

Although dimensions of triangular members 40 and 60 are critical as defined, these members may easily be replaced by a combination of elements. Member 40 may be replaced by a link between pin B and pivot D, a link between pin C and pivot D, and means for rigidly connecting these 2 links so that they rotate about the same angle upon motion about pivot D. In like manner, member 60 may be replaced by a link between pin F and pivot G, a link between pin E and pivot G, and means for rigidly connecting these 2 links so that they rotate about the same angle upon motion about pivot G.

Figure 1A:
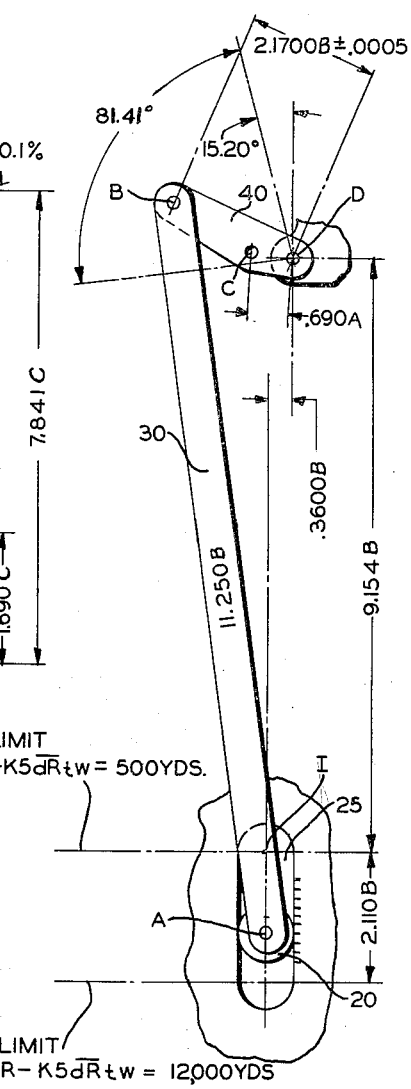
Fig. 1A is a front view of the input section of the mechanism of Fig. 1 showing the critical dimensions thereof.

To summarize the functions of the various sections as shown in Fig. 1, the device may be considered to consist of an X input section shown in Fig. 1A, a middle or connecting section, shown in Fig. 1C, and a $f_1(X)$ output section shown in Fig. 1B.

Figure 3:
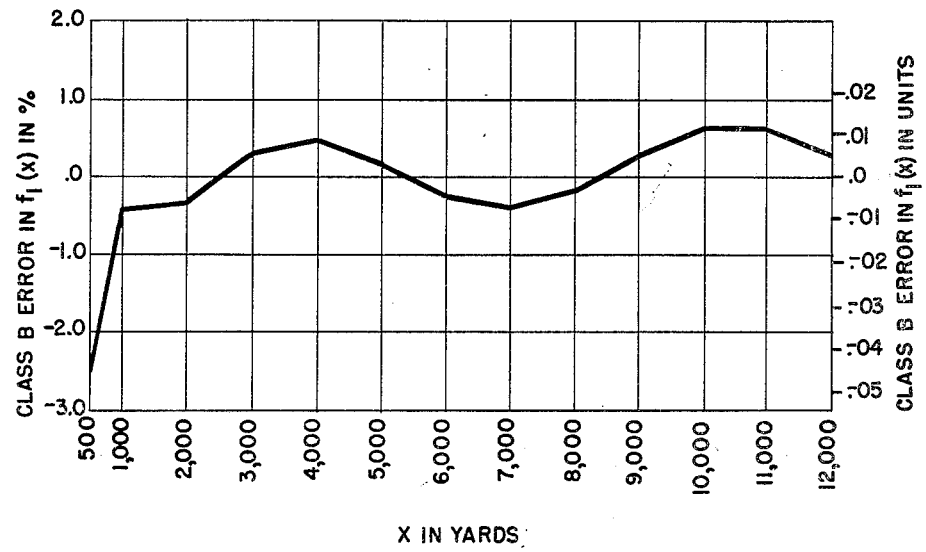
Fig. 3 is a graph indicating the magnitude of the class B errors of the linkage of Fig. 1 in percentage and in units of the function $$f_1(R-K5d\bar{R}tw)$$

Fig. 3 is a graph indicating the precision of the linkage of the present invention over its operating range. The abscissa of the graph is plotted in terms of X in yards, where $$X = R - 5Kd\bar{R}tw$$

and the ordinates indicate the class B errors (i. e. the inherent errors of the linkage which exist by reason of the choice of dimensions and orientation) of the linkage in terms of percent of $$f_1(R-5Kd\bar{R}tw)$$

and in units of the empirical function $f_1(X)$. Examination of the curve will indicate that the linkage will compute the empirical function (Fig. 2) within the required limits of the independent variable $X_1$ to within ½ percent except for a small region of operation at short ranges (small values of X) where the error is as large as 2½ percent. In general, however, the error is fairly evenly distributed throughout the operating range of the linkage.

The invention described in the foregoing specification need not be limited to the details shown which are considered to be illustrative of one form the invention may take.

What is claimed is:

1. A linkage mechanism for computing a specific empirical function of an independent input variable $(R-K5d\bar{R}tw)$, said input variable being measured in yards, and said computed result being indicated in units in accordance with said empirical function, said mechanism comprising, a planar support having first and second slots therein being positioned parallel to the longitudinal axis of said support, said first slot being uniformly calibrated in terms of yards and said second slot being uniformly calibrated in terms of said aforementioned units, first and second slide members respectively slidably mounted in said first and second slots, first and second triangular swinging members pivotally attached to said support, a first link operatively connecting a first unpivoted apex of said first triangular swinging member and said first slide member, a second link operatively connecting a second unpivoted apex of said first triangular swinging member and a first unpivoted apex of said second triangular swinging member, and a third link operatively connecting a second unpivoted apex of said second triangular swinging member and said second slide member, said links and swinging members having the following relative dimensions where the basis of comparison is taken as A, B and C, A, B and C being arbitrary scale factors:

| | |
|---|---|
| Length of said first slot | 2.110B |
| Calibration factor of said first slot | $\frac{5450.6}{B}$ yds./in. |
| Range of operation of said first slide member defined by the said length of said first slot | 500 yds. to 12,000 yds.= 11,500 yds. |
| Length of said second slot | 1.690C |
| Calibration factor of said second slot | $\frac{1.0910}{C}$ units/in. |
| Range of operation of said second slide member defined by the said length of said second slot | −.539 to 1.301=1.840 units |
| Length of said first triangular swinging member from the pivot point thereof to said first unpivoted apex | 2.1700B±.0005 |
| Length of said first triangular swinging member from the pivot point thereof to said second unpivoted apex | .690A |
| Angle included between lines drawn from the pivot point and the said first and second unpivoted apices of said first triangular swinging member | 19.80°±.01° |
| Length of said first link | 11.250B |
| Length of said second link | 1.607A |
| Length of said second triangular swinging member from the pivot point thereof to the said first unpivoted apex thereof | 1.195A |
| Length of said second triangular swinging member from the pivot point thereof to the said second unpivoted apex thereof | 1.930C |
| Angle included between lines drawn from the pivot point of said second triangular swinging member to the said first and second unpivoted apices thereof | 70.76°±.02° |
| Length of said third link | 8.340C |
| Distance along the longitudinal axis of said support between the pivot point of said first triangular swinging member and the 500-yd. limit point of said first slot | 9.154B |
| Distance transversely of the longitudinal axis of said support between the pivot point of said first triangular swinging member and the axis of said first slot | .3600B |
| Distance between the pivot points of said first and second triangular swinging members | A±0.1% |
| Angle included between the line of centers of the pivot points of said first and second triangular swinging members and a line parallel to the longitudinal axis of said support drawn through the pivot point of said first triangular swinging member | 15.00° |
| Distance along the longitudinal axis of said support between the pivot point of said second triangular swinging member and the 1.301 units limit point of said second slot | 7.841C |
| Distance transversely of the longitudinal axis of said support between the pivot point of said second triangular swinging member and the axis of said second slot | 1.800C |
| Angle of rotation of the line joining the pivot point and said first unpivoted apex of said first triangular swinging member corresponding to the limits of movement of said first slide member | 81.41° |
| Angle included between a line parallel to the axis of said support drawn through the pivot point of said first triangular swinging member and a line defining the limit position of said first triangular swinging member corresponding to the 500-yd. limit point of said first slot | 15.20° |
| Angle of rotation of the line joining the pivot point and said second unpivoted apex of said second triangular swinging member corresponding to the limits of movement of said second slide member | 87.39° |
| Angle included between a line transversely of the axis of said support drawn through the pivot point of said second swinging member and a line defining the limit position of said second triangular swinging member corresponding to the 1.301 units limit point of said second slot | 16.24° | the aforementioned dimensions and orientation providing that the displacement of said second slide member varies in accordance with a specific empirical function of the displacement of said first slide member.

2. A universal linkage mechanism for computing a specific empirical function of an independent variable $(R-K5\overline{dR}tw)$, said input variable being measured in yards, and said computed result being indicated in units in accordance with said empirical function, said mechanism comprising, a planar support having first and second slots therein being positioned parallel to the longitudinal axis of said support, said first slot being uniformly calibrated in terms of yards per inch and said second slot being uniformly calibrated in terms of the aforementioned units per inch, first and second slide members respectively slidably mounted in said first and second slots, first and second triangular swinging members pivotally attached to said support, a first link operatively connecting a first unpivoted apex of said first triangular swinging member and said first slide member, a second link operatively connecting a second unpivoted apex of said first triangular member and a first unpivoted apex of said second triangular swinging member, and a third link operatively connecting a second unpivoted apex of said second triangular swinging member and said second slide member, the length of said first slot, the length of said first link, the length of said first triangular swinging member from the pivot point thereof to said first unpivoted apex, the distance along the longitudinal axis of said support between the pivot point of said first triangular swinging member and the extremity of said first slot nearest said pivot point of said first triangular member, and the distance transversely of the longitudinal axis of said support between the pivot point of said first triangular swinging member and the axis of said first slot being proportional to each other in the ratio of 2.110, 11.250, 2.170±.0005, 9.154, and .3600, respectively; the length of said second link, the length of said first triangular swinging member from the pivot point thereof to said second unpivoted apex, the length of said second triangular swinging member from the pivot point thereof to said first unpivoted apex thereof, and the distance between the pivot points of said first and second triangular swinging members being proportional to each other in the ratio of 1.607, .690, 1.195 and 1.0±0.1%, respectively; the length of said second slot, the length of said third link, the length of said second triangular swinging member from the pivot point thereof to said second unpivoted apex thereof, the distance along the longitudinal axis of said support between the pivot point of said second triangular swinging member and the extremity of said second slot furthest removed from said pivot point of said second triangular member, and the distance transversely of the longitudinal axis of said support between the pivot point of said second triangular swinging member and the axis of said second slot being proportional to each other in the ratio of 1.690, 8.340, 1.930, 7.841, and 1.800, respectively; the proportionality factor of each of the aforementioned three groups of dimensions being independent of the proportionality factor of the other two groups of dimensions; the calibration marks on said first slot being uniformly spaced and representing 5450.6 divided by the proportionality factor associated with said first slot yards per inch, the range of operation of said first slide member along the length of said first slot being from 500 to 12,000 yards or 11,500 yards; the calibration marks on said second slot being uniformly spaced and representing 1.0910 divided by the proportionality factor associated with said second slot units per inch, the range of operation of said second slide member along said second slot being from −.539 to 1.301 or 1.840 units; the angle included between lines drawn from the pivot point and the first and second apices of said first triangular swinging member being 19.80°±.01°; the angle included between lines drawn from the pivot point of said second triangular swinging member to the said first and second unpivoted apices thereof being 70.76°±.02°; the angle included between the line of centers of the pivot points of said first and second triangular swinging members and a line parallel to the longitudinal axis of said support drawn through the pivot point of said first triangular swinging member being 15.00°; the aforementioned dimensions and orientation providing that the displacement of said second slide member varies in accordance with a specific empirical function of the displacement of said first slide member.

ANTONIN SVOBODA.

REFERENCES CITED

The following references are of record in the file of this patent:

UNITED STATES PATENTS

| Number | Name | Date |
|---|---|---|
| 2,394,180 | Imm | Feb. 5, 1946 |